(12) United States Patent
Carlisle et al.

(10) Patent No.: US 11,955,106 B2
(45) Date of Patent: Apr. 9, 2024

(54) ACOUSTIC SYSTEM AND METHOD

(71) Applicant: AURALEX ACOUSTICS, Indianapolis, IN (US)

(72) Inventors: Benjamin A. Carlisle, Indianapolis, IN (US); Mark A. Kauffman, Indianapolis, IN (US); Mark Henderson, Indianapolis, IN (US); Andrew Symons, Indianapolis, IN (US); Eric T. Smith, Indianapolis, IN (US)

(73) Assignee: Auralex Acoustics Inc, Indianapolis, IN (US)

( * ) Notice: Subject to any disclaimer, the term of this patent is extended or adjusted under 35 U.S.C. 154(b) by 1083 days.

(21) Appl. No.: 16/154,113

(22) Filed: Oct. 8, 2018

(65) Prior Publication Data

US 2019/0051282 A1    Feb. 14, 2019

Related U.S. Application Data

(62) Division of application No. 15/295,361, filed on Oct. 17, 2016, now Pat. No. 10,096,310.

(60) Provisional application No. 62/242,366, filed on Oct. 16, 2015.

(51) Int. Cl.
*G10K 11/168* (2006.01)
*B29C 70/54* (2006.01)
*B32B 38/00* (2006.01)

(52) U.S. Cl.
CPC .......... *G10K 11/168* (2013.01); *B29C 70/545* (2013.01); *B29C 2793/0009* (2013.01); *B32B 38/0004* (2013.01)

(58) Field of Classification Search
CPC ..... G10K 11/168; B29C 70/545; B29C 70/08; B29C 70/10; B29C 2793/0009; B29C 65/02; B29C 65/48; B29C 66/45; B29C 66/7212; B29C 66/723; B29C 66/7294; B32B 38/0004; B32B 38/06; B32B 38/1866; B32B 2038/0072; B32B 37/04
USPC ........ 156/60, 63, 71, 91, 92, 166, 180, 181, 156/196, 198, 212, 242, 245, 250, 256, 156/264, 267, 293, 308.2, 309.6; 181/284, 290
See application file for complete search history.

(56) References Cited

U.S. PATENT DOCUMENTS

| | | | |
|---|---|---|---|
| 2,497,912 A | 2/1950 | Rees | |
| 2,935,151 A | 5/1960 | Watters et al. | |
| 3,021,915 A | 2/1962 | Kemp | |
| 3,253,675 A | 5/1966 | Brauch | |
| 3,412,513 A * | 11/1968 | Gosele | E04B 9/0478 181/290 |
| 3,583,522 A | 6/1971 | Rohweder et al. | |
| 4,642,951 A * | 2/1987 | Mortimer | B29C 51/00 181/290 |

(Continued)

*Primary Examiner* — Philip C Tucker
*Assistant Examiner* — Brian R Slawski
(74) *Attorney, Agent, or Firm* — Thomas Heed; Heed Law Group

(57) ABSTRACT

An acoustic system is disclosed. The acoustic system includes a sound absorptive substrate, and a rigid polyester shell configured to be positioned over the sound absorptive substrate. The rigid polyester shell is configured to be mounted on an interior surface of a building such that at least some sound waves pass through the rigid polyester shell. The shell is configured to provide aesthetic features to the acoustic system.

20 Claims, 11 Drawing Sheets

(56) References Cited

U.S. PATENT DOCUMENTS

| | | | |
|---|---|---|---|
| D308,577 S | 6/1990 | Hillman | |
| D308,578 S | 6/1990 | Hillman | |
| 5,532,440 A | 7/1996 | Fujiwara | |
| 5,853,843 A * | 12/1998 | Patel | B32B 27/36 428/116 |
| 5,866,235 A * | 2/1999 | Fredrick | B32B 5/26 156/245 |
| 5,976,295 A * | 11/1999 | Ang | B32B 37/04 264/DIG. 75 |
| 10,096,310 B2 | 10/2018 | Carlisle et al. | |
| 2005/0217933 A1 * | 10/2005 | Sung Young | B60R 13/083 181/290 |
| 2006/0090958 A1 * | 5/2006 | Coates | G10K 11/168 181/290 |
| 2006/0214474 A1 * | 9/2006 | Omiya | B60R 13/0861 296/198 |
| 2006/0289231 A1 * | 12/2006 | Priebe | B32B 3/266 181/290 |
| 2008/0296087 A1 * | 12/2008 | Tanaka | B60R 13/08 181/290 |
| 2013/0277146 A1 * | 10/2013 | Lee | B32B 7/02 181/290 |
| 2014/0027200 A1 * | 1/2014 | Mori | G10K 11/168 156/196 |
| 2015/0008070 A1 * | 1/2015 | Caimi | B32B 37/1284 181/290 |
| 2016/0059799 A1 * | 3/2016 | Kim | B32B 27/14 156/244.11 |

\* cited by examiner

ACOUSTIC SYSTEM AND METHOD

CROSS REFERENCE

This application is a divisional of pending U.S. patent application Ser. No. 15/295,361, now U.S. Pat. No. 10,096,310, filed Oct. 17, 2016 and entitled "ACOUSTIC SYSTEM AND METHOD," which claims priority under 35 U.S.C. § 119 to U.S. Provisional Patent App. No. 62/242,366, filed Oct. 16, 2015 and entitled "ACOUSTIC PANEL COVER," each of which is expressly incorporated herein by reference.

TECHNICAL FIELD

The present disclosure relates generally to an acoustic system configured to absorb sound energy, more particularly, to an acoustic system that includes an acoustic panel and a cover.

BACKGROUND

The purpose of an acoustic panel is to absorb sound energy that enters the acoustic panel. In general, acoustic panels are used to control sound and/or reduce noise in a variety of different spaces. For example, a movie theater may include acoustic panels to reduce unwanted sound energy reflected by surfaces in the movie theater.

SUMMARY

An acoustic system including a sound absorptive substrate and a cover sized to receive the sound absorptive substrate is disclosed. The cover includes a rigid polyester shell that is configured to mount on an interior surface or other wall of a building. The rigid polyester shell includes one or more aesthetic features for the acoustic system and is configured to permit at least some sound waves to pass through the rigid shell. A method of producing the acoustic system is also disclosed.

BRIEF DESCRIPTION OF THE DRAWINGS

The detailed description particularly refers to the following figure, in which.

DETAILED DESCRIPTION OF THE DRAWINGS

Figure 1:
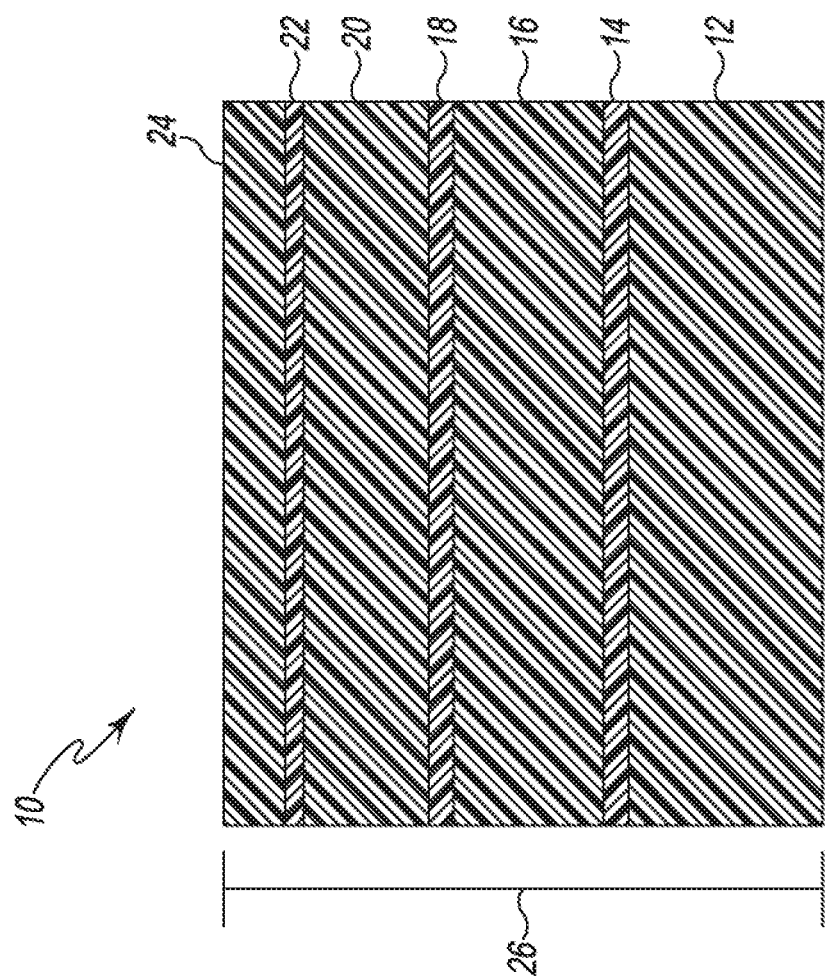
FIG. 1 is a simplified cross-sectional view of an acoustic panel.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover modifications, equivalents, and alternatives falling within the spirit and scope of the invention as defined by the appended claims.

Figure 2:
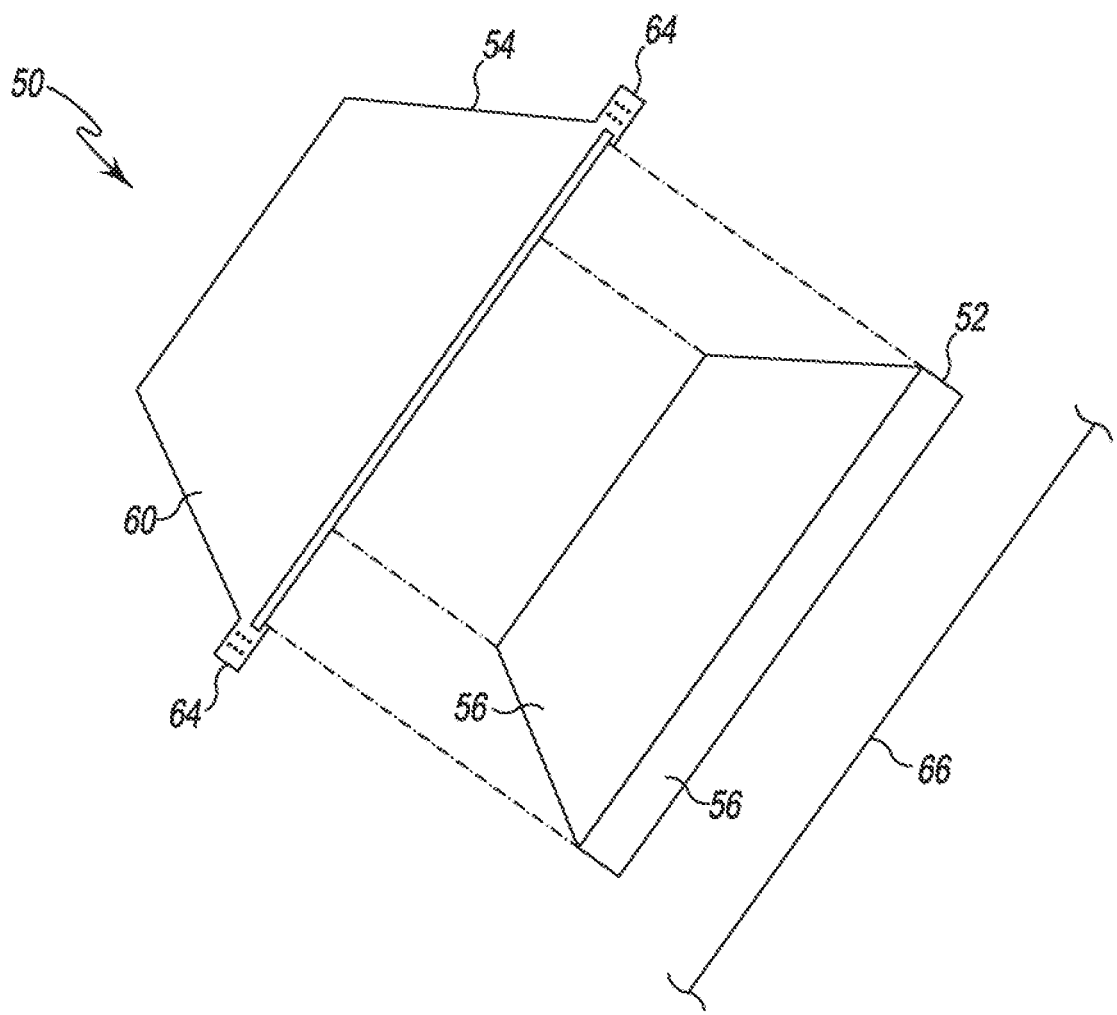
FIG. 2 is an exploded perspective view of an acoustic system that includes an acoustic panel and a cover.

Referring to FIG. 2, an embodiment of an acoustic system 50 is shown. The acoustic system 50 includes an acoustic panel 52 and a cover 54. The acoustic panel 52 may be any substrate or structure that is configured to control sound energy in a space and/or absorb sound energy. The cover 54 attaches to one or more outer surfaces 56 of the acoustic panel 52 and is configured to provide an aesthetic finish to the acoustic system 50. For example, the cover 54 may conceal the acoustic panel 52 from the view of observers, may be formed into one or more shapes, and/or may be printed with one or more colors or designs.

Referring now to FIG. 1, an embodiment of an acoustic panel 52, identified in FIG. 1 as acoustic panel 10, is shown. The acoustic panel 10 is configured to control sound energy in a space and/or absorb sound enemy is shown. The illustrative acoustic panel 10 may embodied as a multi-layer acoustic panel comprising layers made of some type of polyester material, layers made of some type of adhesive material, and an outer layer. In the illustrative embodiment, the acoustic panel 10 includes three layers of polyester material 12, 16, 20 and an outer layer 24 joined together by three layers of adhesive material 14, 18, 22. In other embodiments, the acoustic panel 10 may include any number of layers of polyester material such as, for example, one layer of polyester material. The layers 12, 14, 16, 18, 20, 22, 24 cooperate to define a thickness 26 of the acoustic panel 10. In the illustrative embodiment, the thickness 26 of the acoustic panel 10 does not exceed two inches; however, in some embodiments, the thickness 26 of the acoustic panel 10 may exceed two inches.

The acoustic panel 10 is configured to control sound energy in a space, such as a room, generally by absorbing the sound energy. The illustrative acoustic panel 10 is configured to have better acoustical absorption performance at a given thickness than acoustic panels made from other materials, such as, for example, acoustic panels made from fiberglass, mineral fiber, open cell polyurethane, Melamine foams, and natural fibers, such as cotton or wool. For a given thickness 26 of the acoustic panel 10, the acoustic panel 10 defines a noise reduction coefficient (NRC) that is greater than 1.00 and defines a sound absorption average (SAA) that is greater than 1.00.

The illustrative layer 12 is a non-woven PET fiber panel. The PET fibers of the layer 12 are densified and locked together using a mechanical needling process. The illustrative layer 12 includes a mixture of PET fibers in which 65% of the PET fibers have a hollow cross-sectional profile and 35% of the PET fibers have a penta-lobal cross-sectional profile. The sizes of the PET fibers in the illustrative layer 12 are in a range of 4-6 denier. The layer 12 has a density of 7.5 pounds per cubic foot, and has a flow resistivity of 65,000 Rayls$_{mks}$/m.

In the illustrative embodiment, the layers 16, 20 are identical to the layer 12 as described above. As such, a description the layers 16, 20 is not repeated here. In other embodiments, one or more layers of polyester material in the acoustic panel 10 may include characteristics not found in other layers of polyester material. In that way, the layers of polyester material in the acoustic panel 10 may not be identical.

As described above, each PET fiber of the layer 12 includes a fiber cross-sectional profile. The cross-sectional profile of the PET fibers may be hollow and/or lobed. The hollow fibers may also be lobed. The lobed cross-sectional profiles of the PET fibers may include a tri-lobal cross-sectional profile, a penta-lobal cross-sectional profile, a hexa-lobal cross-sectional profile, an octa-lobal cross-sectional profile, or a conjugate cross-sectional profile. In the illustrative embodiment, the layer 12 includes a mix of PET fiber cross-sectional profiles such as, for example, 65% of the PET fibers in layer 12 have a hollow cross-sectional profile and 35% of the PET fibers in layer 12 have a penta-lobal cross-sectional profile. In other embodiments, the layer 12 includes PET fibers of all one type; for example, the layer may only include PET fibers having a hollow cross-sectional profile. Other embodiments of mixtures of fiber cross-sectional profiles may include a layer with 65% of the PET fibers having a hollow cross-sectional profile and 35% of the PET fibers having a conjugate cross-sectional profile, or a layer with 65% of the PET fibers having a conjugate cross-sectional profile and 35% of the PET fibers having a penta-lobal cross-sectional profile.

As described above, the size of the PET fibers of the layer 12 is between 4-6 denier. In other embodiments, the size of the PET fibers may be between 3-15 denier.

As described above, the layer 12 of polyester material includes a layer density, which is measured in pounds per cubic foot (pcf). As described above, the layer 12 has a density of 7.5 pcf. In other embodiments, the layer 12 may have a density between 7.0-12.0 pcf.

Each of the layers of polyester material 12, 16, 20 are coupled together using an adhesive, illustrated in FIG. 1 as layers of adhesive material 14, 18. The layers of adhesive material 14, 18, 22 are configured to bond the other layers together, increase a flow resistivity of the acoustic panel, and improve the sound absorption performance of the acoustic panel. The type of adhesive used and the amount of adhesive used between the layers may vary according to the layer types and the desired overall acoustic performance of the acoustic panel 10. As described above, the acoustic panel 10 includes a flow resistivity of 65,000 $Rayls_{mks}$/m. In other embodiments, the acoustic panel 10 includes a flow resistivity between 30,000 $Rayls_{mks}$/m and 75,000 $Rayls_{mks}$/m.

The illustrative acoustic panel 10 also includes an outer layer 24 coupled to the layers of polyester material 12, 16, 20 using a layer of adhesive material 22. The outer layer 24 may be molded into a variety of aesthetically pleasing or ornamental shapes using heat and pressure. The outer layer 24 may also be embossed with a pattern to display shapes on an outer surface of the outer layer 24 or to add texture to the outer layer 24. The patterns embossed of the outer layer 24 may also be "tuned" to reflect higher frequency sound energy, and thereby control the sound energy in a space. The outer layer 24 may also display a visible indication. For example, one or more images may be printed on the outer surface of the outer layer 24, including color images. In the illustrative embodiment, the outer layer is no more than 0.25 inches thick. The outer layer 24 may include a polyester material and include many of the same characteristics described above in relation to the layers 12, 16, 20 of polyester material. In some embodiments, the outer layer 24 includes a low-melt fiber to bind the polyester fibers together. A low-melt polyester fiber is an industry term for fibers that melt at less than 200° C. In some embodiments, the outer layer 24 is embodied as the cover 54, which is discussed below in greater detail.

The acoustic panel 10 is capable of being installed in variety of settings using a variety of methods. For example, the acoustic panel 10 may be suspended from a surface such as a ceiling, or may be incorporated into fixtures such that the acoustic panel is not visible to an observer. In order to meet the acoustic needs of a space, the acoustic panel 10, as a whole, may be molded into a variety of aesthetically pleasing and ornamental shapes, including three-dimensional shapes, or may be cut into a variety of shapes. Additionally, the acoustic panel 10 may be colored panel. In some embodiments, just the outer surfaces of the acoustic panel 10 are colored, but, in other embodiments, the entire acoustic panel 10 is colored completely through.

The acoustic panel 10 may include any number of layers of polyester material. For example, an acoustic panel 10 may only comprise one layer of polyester material. In another example, the acoustic panel 10 may comprise twelve layers of polyester material. In some embodiments, each layer of polyester material of the acoustic panel 10 may comprise identical characteristics as the other layers of polyester material in the acoustic panel 10. For example, every layer of polyester material of the acoustic panel 10 may include the same fiber cross-sectional profile, fiber size, density, and layer thickness. In other embodiments, one or more of the layers of polyester material may comprise characteristics different from one or more other layers of polyester material found in the acoustic panel 10. For example, the layer 12 may have different characteristics from the layer 16 of the illustrative acoustic panel 10. In some embodiments, the characteristics of the individual layers of the acoustic panel 10 are chosen to customize the acoustic panel's acoustic performance to the needs of a specific space. In this way, the acoustic panel 10 can be "tuned" to absorb particular frequencies of sound energy.

The thickness 26 of the acoustic panel 10 may vary between 0.5 inches and 3 inches. The thickness of each individual layer of the acoustic panel 10 may also vary. For example, the thickness of a layer of polyester material is different than the thickness of a layer of adhesive material, and the thickness of the outer layer 24 is different than thickness of the other two types of layers. In some embodiments, each layer of polyester material is the same thickness. In other embodiments, one or more layers of polyester material have thicknesses different from other layers of polyester material. In some embodiments, each layer of adhesive material is the same thickness. In other embodiments, one or more layers of adhesive material have thicknesses different from other layers of adhesive material. In some embodiments, the layer 12 is configured to be less than 1 inch thick. In other embodiments, the thickness of an individual layer 12, 16, 20 may be between 0.1 inches thick and 3 inches thick.

In some embodiments, the acoustic panel 10 does not include an outer layer 24 (or the layer 22 of adhesive material). In other embodiments, the acoustic panel 10 includes another outer layer, such that the two outer layers sandwich all of the layers of polyester material between them. In some embodiments, the layers of polyester material include low-melt polyester to bind the polyester fibers together.

Figure 3:
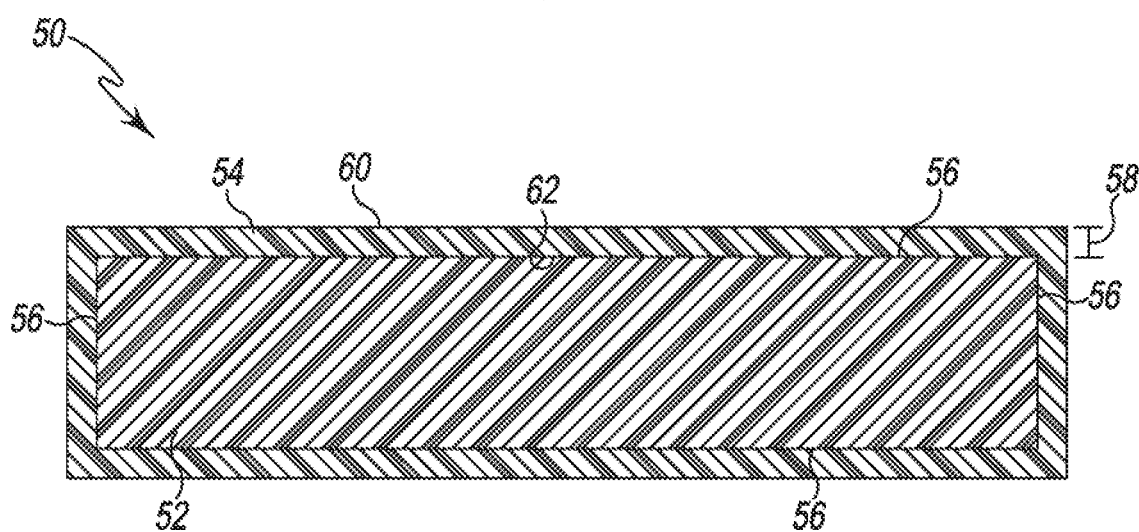
FIG. 3 is a simplified cross-sectional view of the acoustic system of FIG. 2.

Referring now to FIGS. 2 and 3, an acoustic system 50 for controlling sound in a space is shown. As discussed above, the acoustic system 50 includes an acoustic panel 52 and a scrim or cover 54. In the illustrative embodiments of FIG. 2, the acoustic panel 52 and the cover 54 are both square shaped. In other embodiments, the acoustic panel 52 and the cover 54 may be into any number of shapes. In some embodiments, the cover 54 may be formed to conform to the shape of the acoustic panel 52.

As described above, the acoustic panel 52 may be any structure that is configured to control sound in a space. In particular, the acoustic panel 52 is configured to absorb sound energy as the sound energy passes through the acoustic panel 52. The acoustic panel 52 may be embodied as an acoustic panel made of fiberglass, polyester, acoustic foam, cotton or other acoustically absorptive material. In the illustrative embodiment of FIGS. 2 and 3, the acoustic panel 52 includes a single layer of sound-absorbing material. In other embodiments, the acoustic panel 52 may be embodied as a multi-layer acoustic panel, such as the acoustic panel 10 described above. The acoustic panel 52 is also configured to be mounted to a variety of interior finishes. For example, the acoustic panel 52 may be configured to be hung on a wall or may be suspended from a ceiling. In that way, the acoustic panel 52 may be rigid or semi-rigid.

The cover 54 attaches to one or more outer surfaces 56 of the acoustic panel 52 and is configured to provide aesthetic features to the acoustic system 50. The cover 54 includes a thickness 58 defined between a front surface 60 and a back surface 62. In the illustrative embodiment, the cover 54 is made of a polyester material where 45% of the polyester material is low-melt polyester and the thickness 58 of the cover 54 is 0.125 inches. The thickness 58 of the cover 54 may be as thin as 0.0625 inches or may be as thick as 0.25 inches. The cover 54 may include as little as 30% low-melt polyester material or may include as much as 60% low-melt polyester material. In some embodiments, the polyester material may include nonwoven polyester fibers. The cover 54 may be similarly embodied as the outer layer 24 discussed above.

In the illustrative embodiment, the cover 54 is configured to be acoustically transparent such that sound energy or waves passes through the cover 54. The cover 54 may have an average insertion loss of 3 dB or less. In other embodiments, the cover 54 may be configured to control sound in a space by either absorbing some or all of the sound waves or by reflecting some or all sound waves. For example, one or more patterns may be engraved or embossed of the front surface 60 of the cover 54, the one or more patterns being configured to reflect certain frequencies of sound waves.

The cover 54 is configured to provide aesthetic features to the acoustic system 50 by concealing the acoustic panel 52 from visual observation and providing aesthetic finishes, such as shapes, colors and/or designs, to the acoustic system 50. The cover 54 may be molded into a variety of aesthetically pleasing or ornamental shapes using heat and pressure. The cover 54 may also be engraved or embossed with a pattern to display shapes on front surface 60 or to add texture to the cover 54. The cover 54 may also be dyed or printed with certain colors. For example, the cover 54 may be dyed to be a certain color, such as white. In another example, one or more images may be printed on the front surface 60 of the cover 54. The aesthetic finishes of the cover 54 may be similarly embodied as the aesthetic finishes of the outer layer 24 discussed above.

The back surface 62 of the cover 54 is attached to one or more outer surfaces 56 of the acoustic panel 52. The cover 54 may be secured to the acoustic panel 52 using an adhesive material, such as glue or the adhesive material 22 described above. The cover 54 may also be secured to the acoustic panel 52 using one or more fasteners. In the illustrative embodiment of FIG. 3, the cover 54 encloses completely the acoustic panel 52 and attaches to all of the outer surfaces 56 of the acoustic panel 52. In other embodiments, the cover 54 only contacts some of the one or more outer surfaces 56. In yet other embodiments, the cover 54 is attached to portions of the one or more outer surfaces 56.

The cover 54 also includes a number of brackets 64 configured to receive a screw, peg, or other fastener to secure the acoustic system 50 (i.e., the panel 52 and the cover 54) to an interior surface 66 of a building. In the illustrative embodiment, the cover 54 is rigid and self-supporting. In that way, load/weight of the acoustic system 50 is carried by the cover 54, and the acoustic panel 52 does not structurally support the mounting of the acoustic system 50 on the interior surface 66. In other embodiments, the acoustic panel may support the mounting of the acoustic system.

Figure 4:
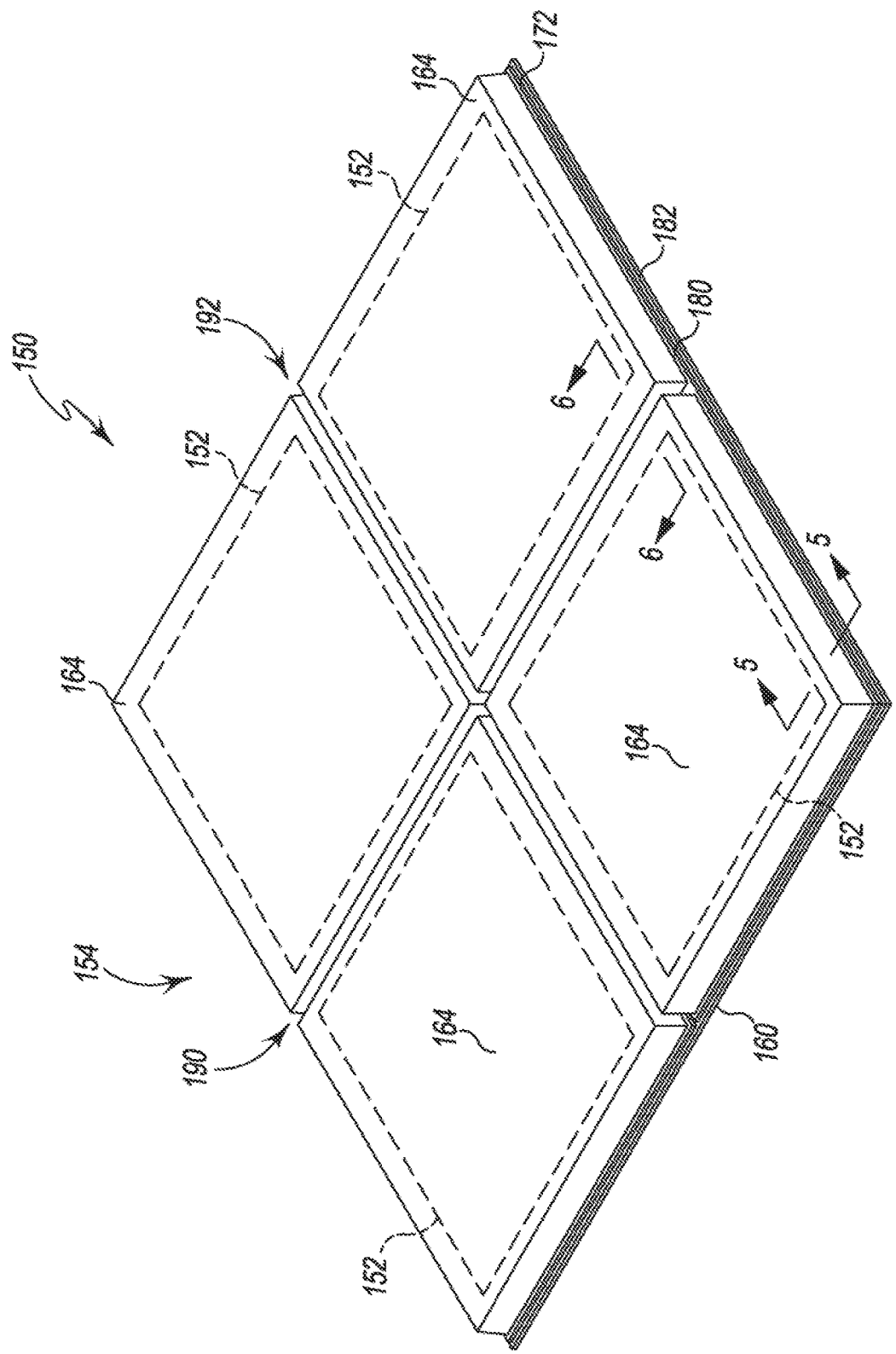
FIG. 4 is a perspective view of another embodiment of an acoustic system including an acoustic panel and a cover.

Referring now to FIG. 4, another embodiment of an acoustic system 150 is disclosed. The system 150 includes a plurality of sound absorptive substrates 152, and each substrate 152 is positioned in a compartment 156 (see FIG. 5) defined in a cover 154. Similar to the acoustic system 50, the acoustic system 150 each sound absorptive substrate 152 is illustratively embodied as an acoustic panel 52. It should be appreciated that in other embodiments the substrates 152 may take the form of other sound absorptive materials that may be positioned in the compartments 156 of the cover 154.

The cover 154 includes a rigid shell 160 is a single integral, monolithic component that is formed from a polyester material. In the illustrative embodiment, the polyester material includes non-woven polyester fibers that have been molded in the shape shown in FIG. 4. Like the cover 54 described above, the cover 154 is configured to be self-supporting such that load/weight of the acoustic system 150 is carried by the cover 154 alone, and the substrates 152 do not structurally support the mounting of the acoustic system 150 on an interior surface 66 of a building. The acoustic system 150 also includes a number of brackets (not shown) configured to receive a screw, peg, or other fastener to secure the acoustic system 150 to the interior surface 66.

Figure 5:
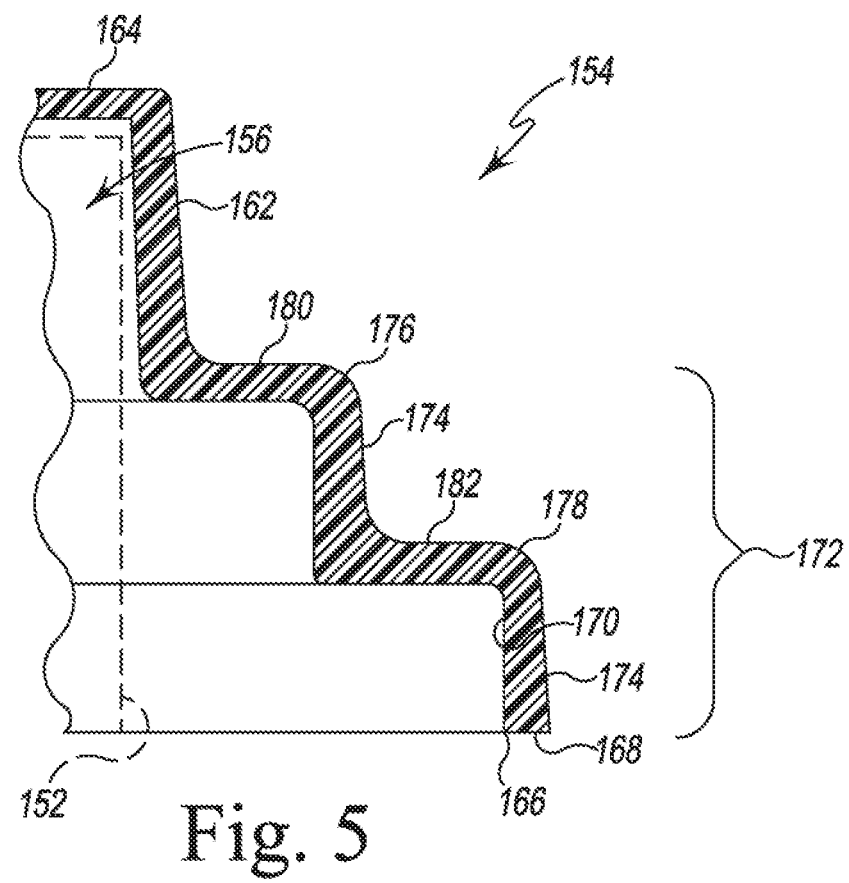
FIG. 5 is a cross-sectional partial side elevation view of the acoustic system of FIG. 4 taken along the line 5-5 in FIG. 4 with the acoustic panel shown in broken line.

The rigid shell 160 of the cover 154 includes a plurality of cover panels 162 that are positioned over the substrates 152. Each cover panel 162 has a front surface 164, and the front surfaces 164 cooperate to define the front face of the rigid shell 160. As shown in FIG. 5, an opening 166 is defined in a rear surface 168 of the rigid shell 160. An inner wall 170 extends inwardly from the opening 166 to define the compartments 156 of the shell 160. In the illustrative embodiment, the compartments 156 are interconnected and cooperate to define a single cavity in the shell 160. It should be appreciated that in other embodiments the compartments may be physically separated units.

As shown in FIGS. 4-5, the cover panels 162 extend from a base 172. In the illustrative embodiment, the base 172 includes a plurality of stepped walls 174 that define a pair of layers 176, 178 below the cover panels 162. The layer 176 has an upper surface 180 that extends around the perimeter of the panels 162. The layer 178 has an upper surface 182 that extends around the perimeter of the layer 176. It should be appreciated that in other embodiments the base may have additional or fewer layers. In other embodiments, the base may be omitted. Each of the surfaces 180, 182 is substantially planar in the illustrative embodiment.

Figure 6:
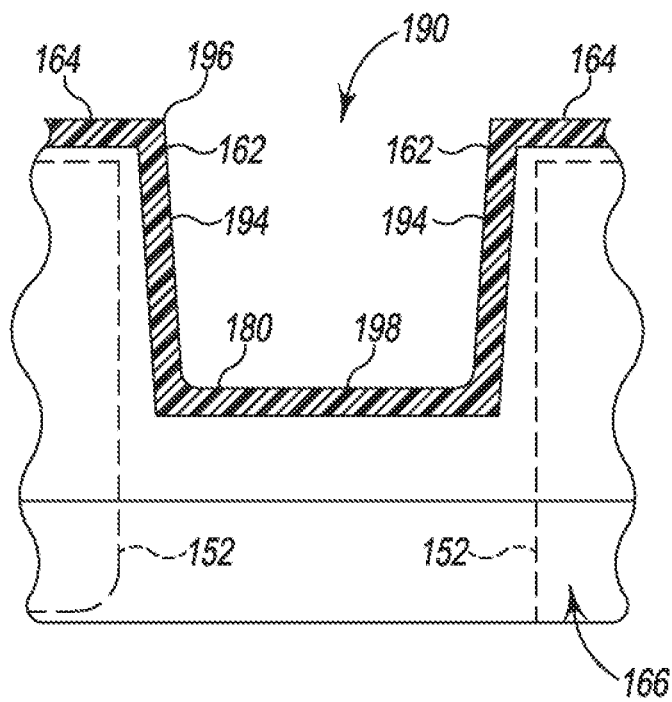
FIG. 6 is a cross-sectional partial side elevation view of the acoustic system of FIG. 4 taken along the line 6-6 in FIG. 4 with the acoustic panel shown in broken line.

Returning to FIG. 4, a pair of channels 190, 192 extend between and separate the cover panels 162. In the illustrative embodiment, the channels 190, 192 have open ends and different cross-sectional geometries. As shown in FIG. 6, the sidewalls 194 of the cover panels 162 extend inwardly from an opening 196 to a section 198 of the upper surface 180 of the layer 176 to define the channel 190. The sidewalls 194 extend in a non-orthogonal direction relative to the surface section 198 in the illustrative embodiment but in other embodiments may be perpendicular to the upper surface.

Figure 7:
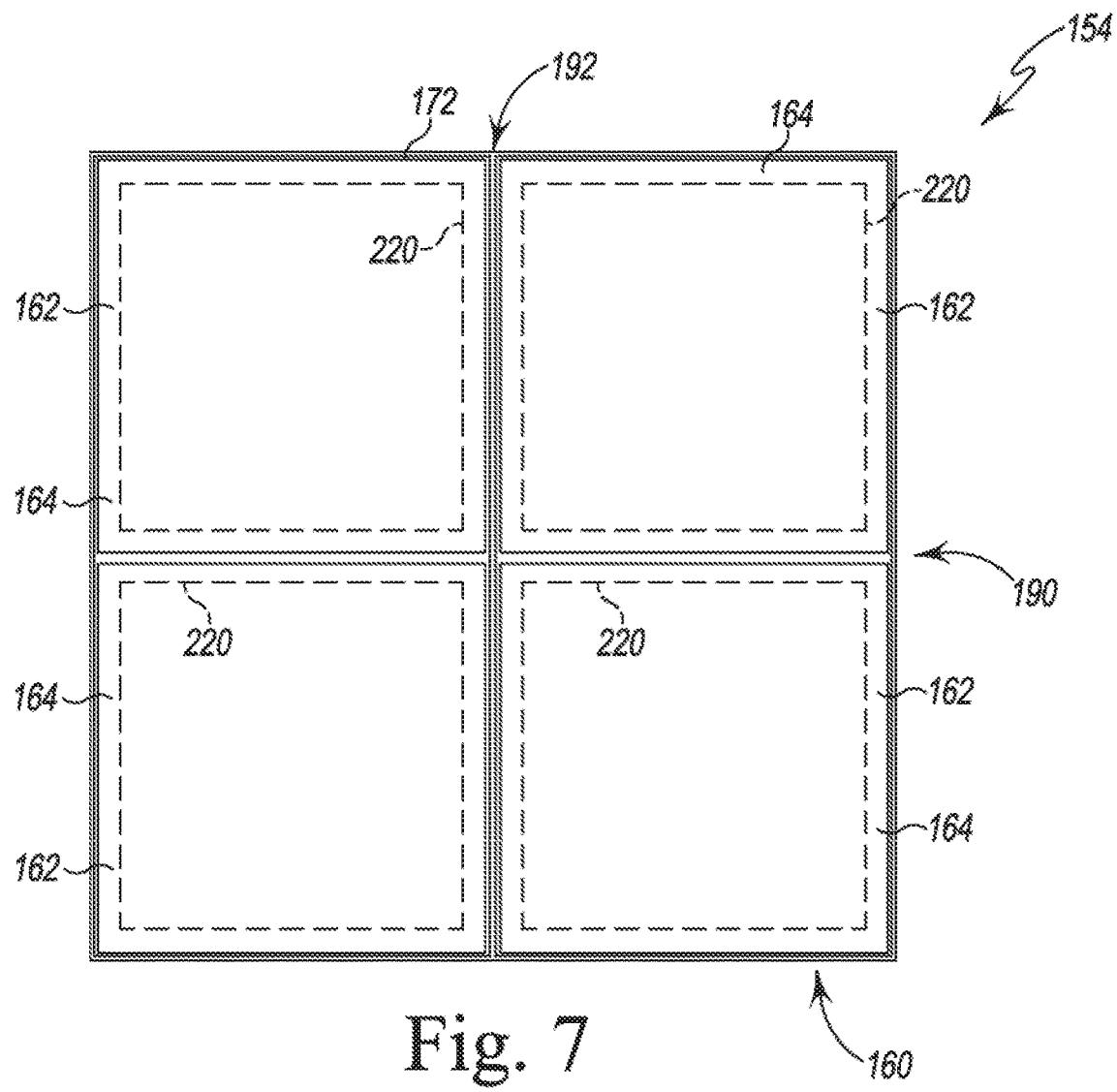
FIG. 7 is a top plan view of the acoustic system of FIG. 4.

As shown in FIG. 7, the channel 190 extends perpendicular to, and intersects, the channel 192 in the illustrative embodiment. The channels 190, 192 also follow substantially straight lines. It should be appreciated that in other embodiments the channels may extend at angles other than 90 degrees relative to each other. The channels may also be curved. In still other embodiments, one or both of the channels may be omitted.

Figure 8:
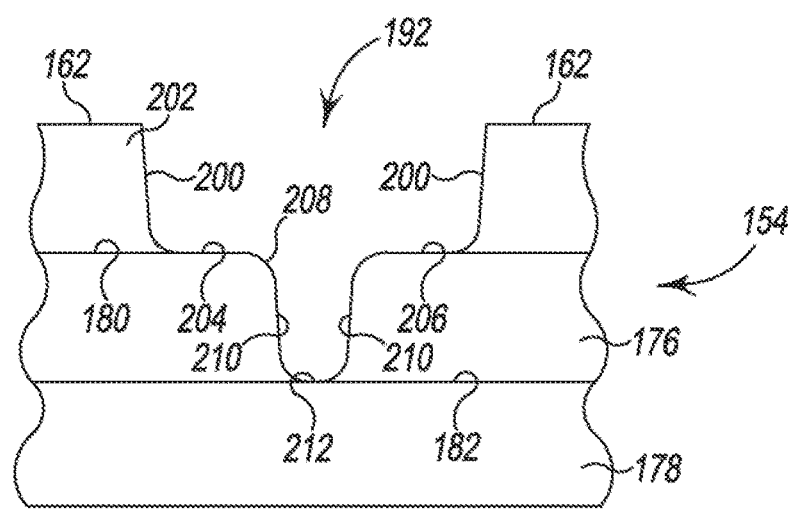
FIG. 8 is a partial side elevation view of a channel defined in the cover of the acoustic system of FIG. 4.

As shown in FIG. 8, the channel 192 has a different cross-sectional geometry from the channel 190. In the illustrative embodiment, the cross-sectional geometry of the channel 192 is more complex than the geometry of the channel 190, as described in greater detail below. The upper region of the channel 192 is defined by the sidewalls 200 of the cover panels 162, which extend inwardly from an opening 202 to a pair of surface sections 204, 206 of the layer 176. The surface sections 204, 206 extend away from the lower ends of the sidewalls 200 to an opening 208. The lower region of the channel 192 is defined by a pair of stepped walls 210 that extend from the opening 208 to an inner section 212 of the upper surface 182 of the lower layer 178.

Returning to FIG. 7, each cover panel 162 includes a region 220 on its front surface 164. Each region 220 includes an aesthetic feature in the illustrative embodiment. For example, each region 220 may include an embossing or engraving formed in a visually distinct geometric pattern. In other embodiments, the region 220 may include printed alphanumeric characters arranged in a pattern on the front surface 164. Each region 220 may include other printed designs, colors, or patterns.

Figure 9:
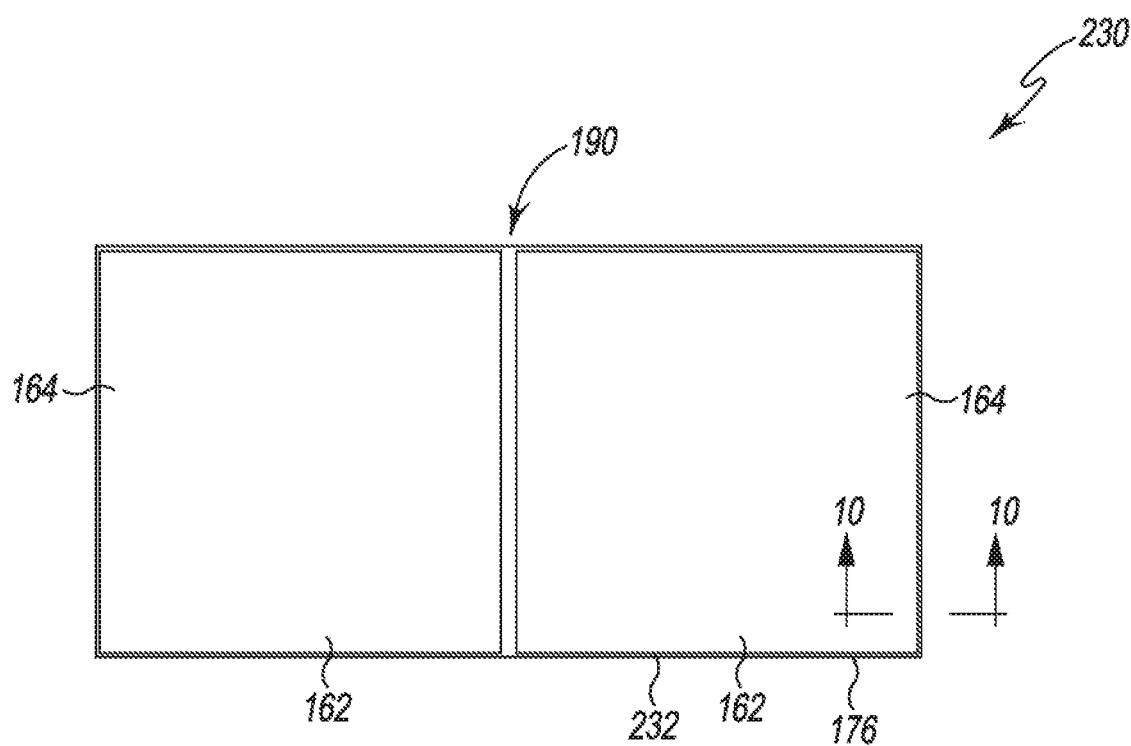
FIG. 9 is a top plan view of another embodiment a cover of an acoustic system.
Figure 10:
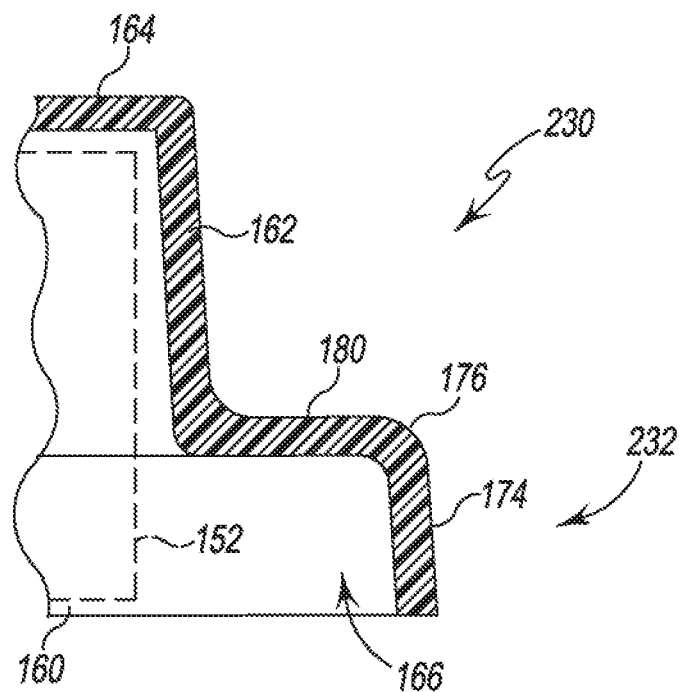
FIG. 10 is a cross-sectional partial side elevation view of the cover of FIG. 9 taken along the line 10-10 in FIG. 9.

As described above, the cover 154 is formed via a molding process that creates the cover panels 162 and the base 172. In some applications, a user may desire an acoustic system with fewer cover panels. In the illustrative embodiment, the cover 154 is configured to permit the user to separate the cover panels 162 into more than one cover. To do so, the user may apply a knife or other cutting tool to the inner section 212 of the upper surface 182 of the lower layer 178. The user may then advance the cutting tool along the channel 192 until the cover 154 is divided into two covers 230 (see FIG. 9) that have two cover panels 162 each. The user may then apply the cutting tool to each of the covers 230 to remove the rest of the lower layers 178. As shown in FIGS. 9-10, the resulting cover 230 includes the cover panels 162 positioned on a smaller base 232, which includes only the layer 176.

Should the user desire an acoustic system with only a single cover panel, the user may apply a knife or other cutting tool to the layer 176 to separate the panels 162 from one another. The user may use the cutting tool to remove the remainder of the layer 176. The resulting covers include only the panel 162 without a base.

Figure 11:
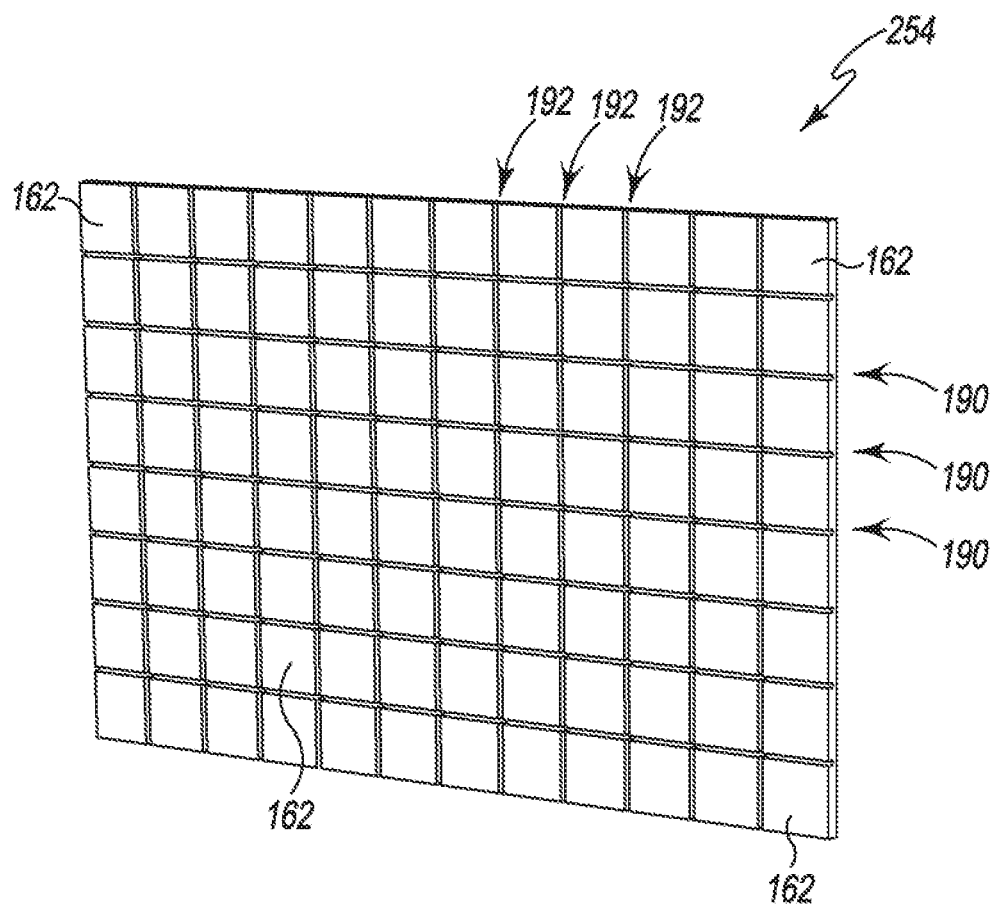
FIGS. 11-15 are perspective views of other embodiments of covers for acoustic systems.

As shown in FIG. 11, a cover 254 may be produced with many cover panels 162. The panels 162 are separated by a plurality of channels 190 extending in one direction and a plurality of channels 192 extending in a perpendicular direction. If the user desires an acoustic system with fewer panels, the user may follow the steps outlined above to produce covers having the desired number of cover panels.

Figure 12:
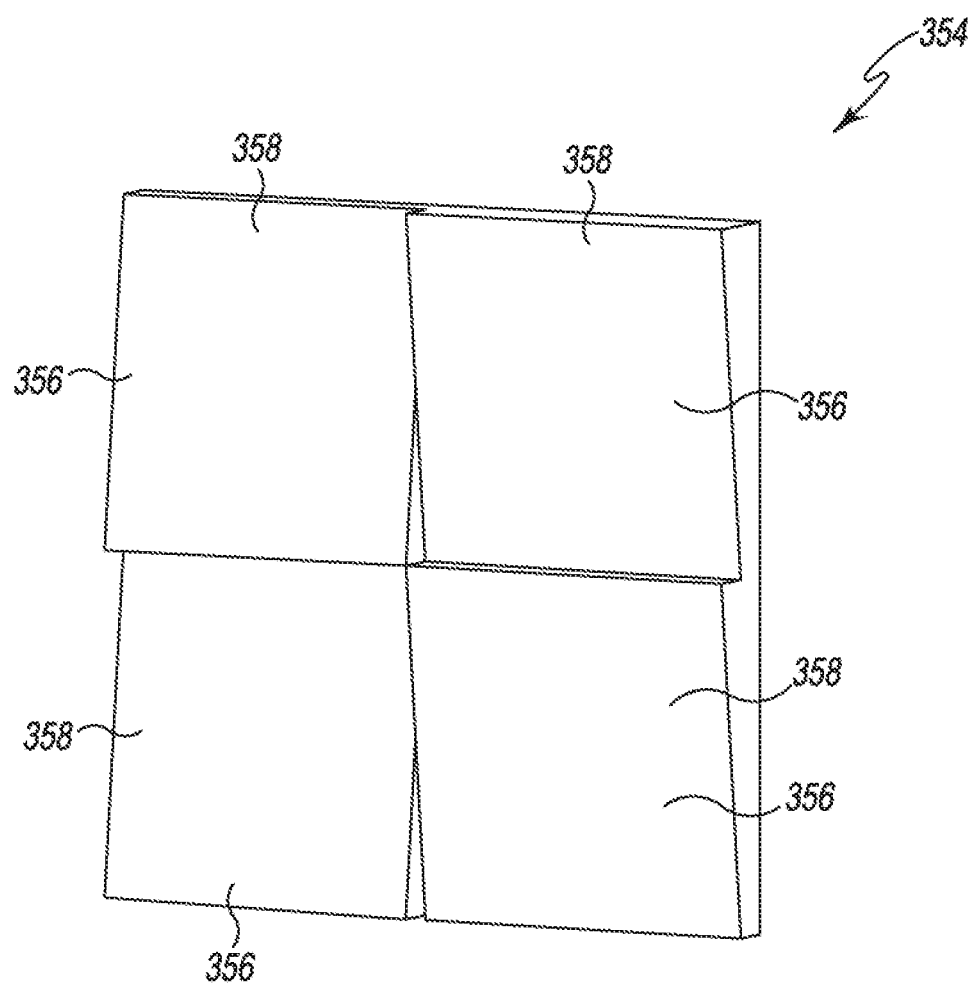
Figure 13:
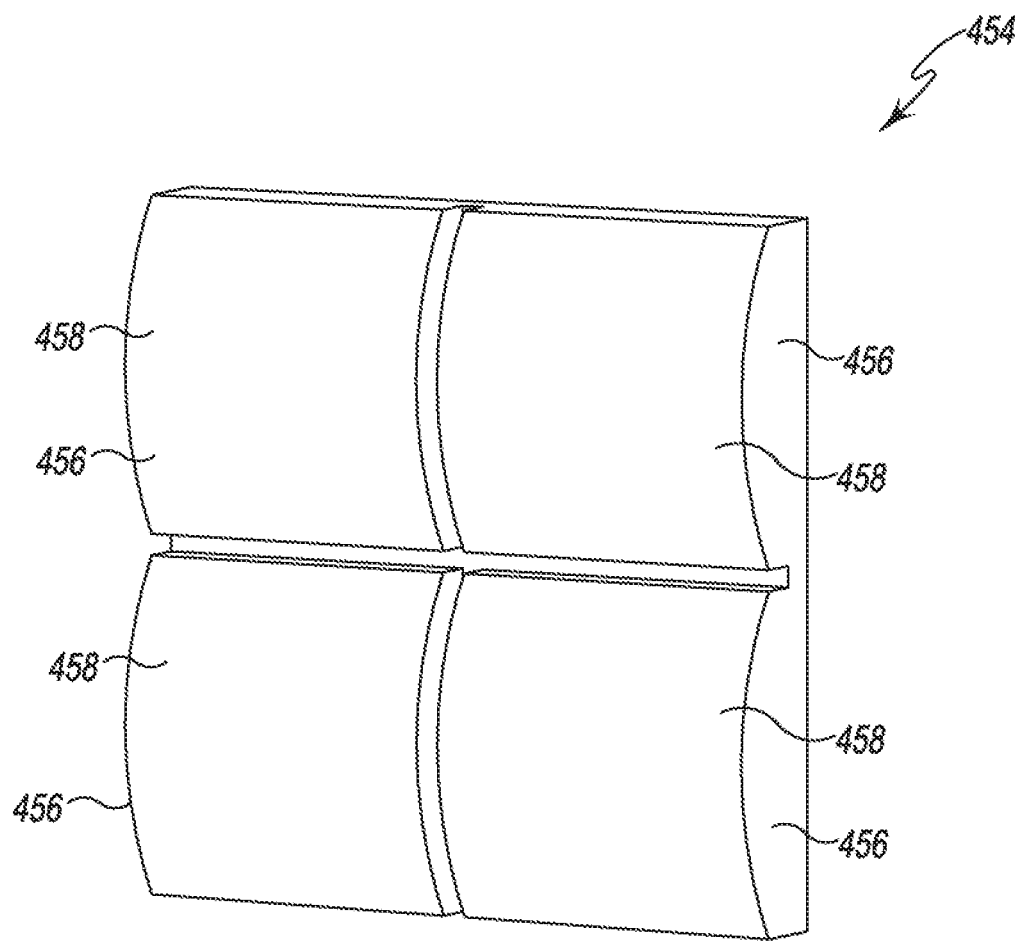
Figure 14:
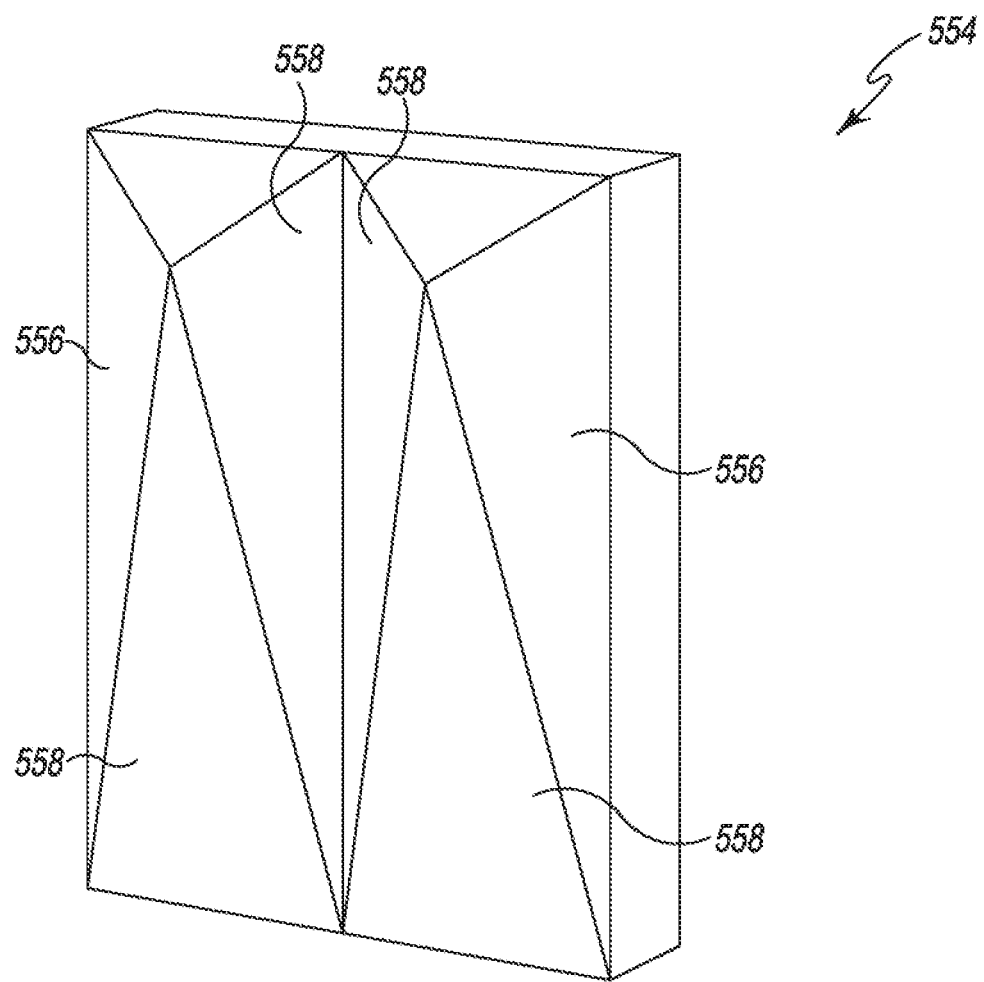

Referring now to FIGS. 12-14, other embodiments of covers (covers 354, 454, 554) are shown. Each of the covers 354, 454, 554 have been molded with cover panels 356, 456, 556 of different configurations. As shown in FIG. 12, the panels 356 have inclined or angled front surfaces 358, while the panels 456 of the cover 454 have been molded with curved front surfaces 458. The cover panels 556 of the cover 554 have multiple front surfaces 558 to define a more complex front face.

Figure 15:
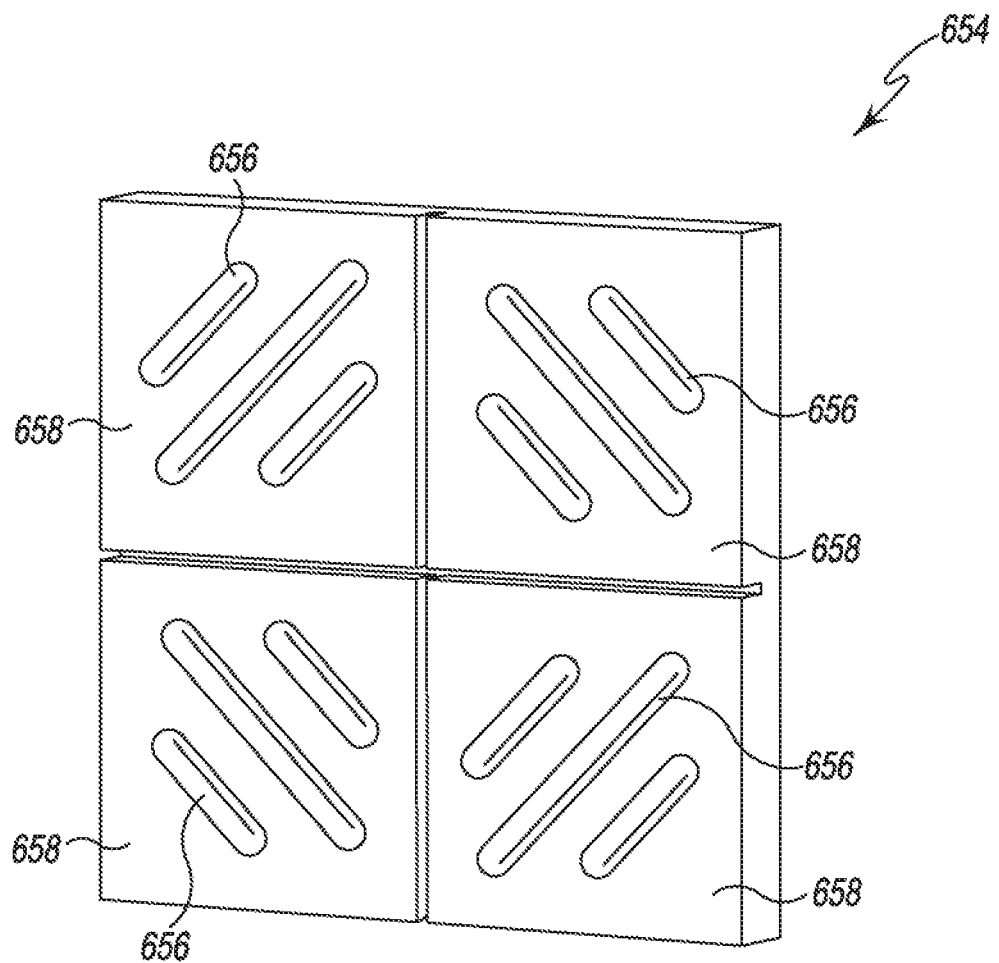

Referring now to FIG. 15, a cover 654 is shown having a plurality of embossings 656 defined on its front surface 658. As described above, the embossings may be arranged to form other patterns. As shown in FIGS. 12-15, each of the covers 354, 454, 554, 654 do not include a base. It should be appreciated that in other embodiments any of the covers may include a base, as well as additional or fewer cover panels.

GLOSSARY OF TERMS

Absorption Coefficient—A unitless number measured in Sabins typically ranging from 0.00 to 1.00. The higher the absorption coefficient, the greater sound absorption.

Noise Reduction Coefficient (NRC)—An average of absorption coefficients centered on the ⅓rd octave bands at center frequencies 250 Hz, 500 Hz, 1000 Hz and 2000 Hz, rounded to the nearest 0.05.

Sound Absorption Average (SAA)—An average of the ⅓rd octave bands ranging from 200 Hz to 2500 Hz, rounded to the nearest 0.01.

Specific Flow Resistance—The change in pressure (ΔP) divided by the velocity (U) of airflow through tested sample, (ΔP/U), measured in $Rayls_{mks}$. Tested to the ASTM C522 standard.

Flow Resistivity—Specific flow resistance divided by thickness (d) of tested sample, (ΔP/Ud), measured in $Rayls_{mks}$/m. Tested to the ASTM C522 standard.

Denier—The mass in grams of a length of 9000 meters of the fiber.

PCF—Bulk density measured in pounds per cubic foot (lbs/ft3).

PET—Polyethylene Terephthalate (Polyester).

mks—SI System of units standing for meters, kilograms, seconds.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected. Illustrative examples of the technologies disclosed herein are provided below. An embodiment of the technologies may include any one or more, and any combination of, the examples described below.

According to one example, a cover sized to be positioned over a sound absorptive substrate is disclosed. The cover comprises a rigid polyester shell having a first surface, a second surface positioned opposite the first surface, and an opening defined in the second surface. The opening is sized to receive the sound absorptive substrate. The rigid shell is configured to be mounted on an interior surface of a building such that at least some sound waves pass through the first surface of the rigid shell.

In some embodiments, the rigid polyester shell may comprise non-woven polyester fibers. Additionally, in some embodiments, the first surface of the rigid shell may include a visible geometric pattern. In some embodiments, the visible geometric pattern may include an engraving. In some embodiments, the visible geometric pattern may include an embossed pattern.

In some embodiments, the first surface of the rigid shell may include an aesthetic pattern. In some embodiments, the rigid shell may include a plurality of separate compartments. Each compartment may be sized to receive a sound absorptive substrate.

In some embodiments, the first surface may include a plurality of surfaces defining a face of the shell. In some embodiments, the sound absorptive substrate may include an acoustic panel. Additionally, in some embodiments, the sound absorptive substrate may include a semi-rigid panel.

According to another example, an acoustic system comprises a sound absorptive substrate, and a rigid polyester shell positioned over the sound absorptive substrate. The rigid polyester shell is configured to be mounted on an interior surface of a building such that at least some sound waves pass through the rigid polyester shell, and the shell is configured to provide aesthetic features to the acoustic system.

In some embodiments, the rigid polyester shell may comprise non-woven polyester fibers. In some embodiments, the rigid polyester shell may include a plurality of surfaces that define a face of the shell.

In some embodiments, the rigid polyester shell may be one Of embossed and engraved. In some embodiments, the rigid polyester shell may be a self-supporting body.

According to another example, a method of manufacturing an acoustic system is disclosed. The method comprises selecting a molded polyester shell, advancing a cutting tool along a first channel defined between cover panels of the molded polyester shell to form a pair of covers, and positioning one of the pair of covers over a sound absorptive substrate.\ There exist a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

We claim:

1. A method of manufacturing an acoustic system, comprising:
   selecting a rigid molded polyester shell,
   advancing a cutting tool along a first channel defined between cover panels of the rigid molded polyester shell to form a pair of covers, and
   positioning one of the pair of covers over a sound absorptive substrate.

2. The method of claim 1, comprising forming the rigid molded polyester shell using heat and pressure.

3. The method of claim 1, comprising embossing the rigid molded polyester shell.

4. The method of claim 1, comprising engraving the rigid molded polyester shell.

5. The method of claim 1, wherein the rigid molded polyester shell has a curved front face.

6. The method of claim 1, wherein the rigid molded polyester shell comprises non-woven polyester fibers.

7. The method of claim 6, wherein the non-woven polyester fibers define a path for sound waves to pass through the rigid molded polyester shell.

8. The method of claim 7, wherein the rigid molded polyester shell has a front surface and a rear surface; wherein an opening is defined by the rear surface;
   and wherein the rigid molded polyester shell is devoid of perforations extending from the front surface through the rear surface to the opening.

9. The method of claim 1, wherein the rigid molded polyester shell is a self-supporting body.

10. The method of claim 1, comprising advancing the cutting tool along a second channel defined between the cover panels of the rigid molded polyester shell.

11. The method of claim 1, wherein the rigid molded polyester shell includes a cover panel and a lower layer located below the cover panel.

12. The method of claim 11, wherein the rigid molded polyester shell includes a first lower layer and a second lower layer, each located below the cover panel, and the first lower layer is located between the second lower layer and the cover panel.

13. The method of claim 12, comprising advancing the cutting tool around the second lower layer to separate the second lower layer from the cover.

14. The method of claim 12, comprising advancing the cutting tool around the first lower layer to separate the first lower layer from the cover.

15. A method of manufacturing an acoustic system, comprising:
   forming a multi-layer acoustic panel by adhering a first polyester panel to a second polyester panel having a density between 7.0-12.0 pcf,
   wherein the multi-layer acoustic panel has a noise reduction coefficient of greater than 1.00.

16. The method of claim 15, comprising positioning a rigid molded polyester shell over the multi-layer acoustic panel.

17. The method of claim 16, wherein the rigid molded polyester shell comprises non-woven polyester fibers.

18. The method of claim 17, wherein the non-woven polyester fibers define a path for sound waves to pass through the rigid molded polyester shell.

19. The method of claim 18, wherein the rigid molded polyester shell has a front surface and a rear surface; wherein an opening is defined by the rear surface;
   and wherein the rigid molded polyester shell is devoid of perforations extending through the front and rear surfaces to the opening.

20. The method of claim 19, wherein the acoustic panel has a sound absorption average that is greater than 1.00.

* * * * *